Aug. 11, 1953　　　A. R. JUBENVILLE　　　2,648,826
ELECTRICAL TEST PROBE
Filed July 10, 1950
FIG. 1
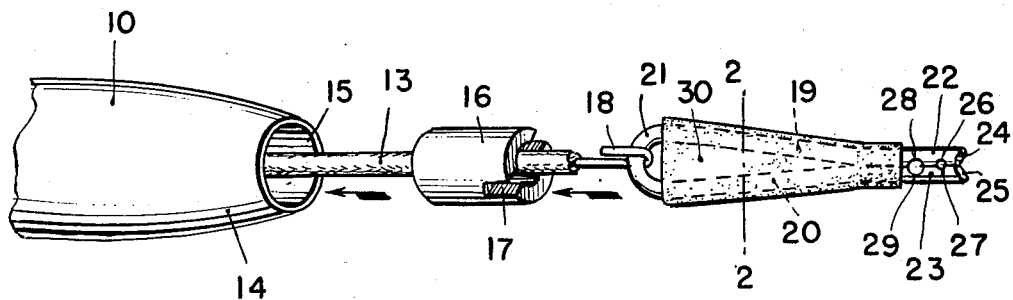
FIG. 2
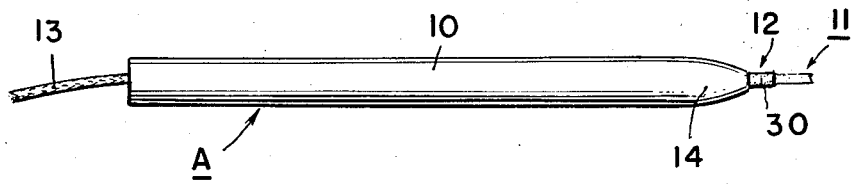
FIG. 3
*INVENTOR*
ARTHUR R. JUBENVILLE,
BY *Wendewoth, Lind & Ponack*
ATTORNEYS Patented Aug. 11, 1953

2,648,826

UNITED STATES PATENT OFFICE 2,648,826

ELECTRICAL TEST PROBE

Arthur Raymond Jubenville, Huntington, N. Y.

Application July 10, 1950, Serial No. 172,827

3 Claims. (Cl. 339—200)

This invention relates to an electrical test probe tip for use in various fields of electrical testing and measuring.

Heretofore various types of probe tips for terminating meters as well as other types of measuring or circuit analysis gear have been utilized but these previous probe tips had various drawbacks such as the inability to lock on to circuit elements which in many instances is essential to provide the operator with free hands and previous probe tips have in many instances been entirely uninsulated over their entire tip length. This last mentioned deficiency left an unnecessarily large area exposed which increased the possibilities of inadvertently short-circuiting a circuit or combination of circuits or elements resulting in destruction or impairment of components or in abnormal interpretation of a test reading of a given set of circuit conditions. These factors have contributed to a considerable loss of time and decreased efficiency in the inspection, installation and maintanence of the circuits of a wide range of types of electric and electronic gear.

An object of the present invention is to provide a novel type of test probe tip which overcomes the aforementioned drawbacks and provides a probe which will be satisfactory both mechanically and electrically.

A further object of the invention is to provide a probe which eliminates the possibility of accidental short-circuiting of a circuit or other undesirable results or effects.

A further object of the present invention is to provide a test probe which is quickly and easily adaptable to the elements of a circuit to be checked and which is additionally quickly shiftable from one element to another to facilitate rapidly checking an entire circuit.

A still further object of the invention is to provide a test probe the use of which after connection to an element leaves the operator's hands free for essential associated procedures.

A still further object of the invention is to provide a device which is suitable for use as an electrical test probe but also may be adapted to jumpers for temporarily or otherwise connecting different points in a circuit.

An additional object of the invention is to provide a test probe of the character described having a large range of use and connection in a positive manner in the various ranges and also being small in size for reaching into inaccessible places.

Further objects and features of the present invention will be apparent from the following detailed description of a single preferred species of the invention when taken together with the accompanying drawing in which Figure 1 is a perspective view of the test probe of the present invention in partial assembled relationship;

Figure 2 is a sectional view on the line 2—2 of Figure 1, and

Figure 3 is a plan view of the assembled test probe of the present invention.

In the drawings the assembled test probe generally designated A and, as shown, in Figure 3 comprises a body portion 10, a tip portion 11, an insulating jacket 12 and a test lead wire 13. The body portion 10 may be composed of plastic or fiber of insulating material and constitutes the probe shell having a longitudinal opening therethrough permitting passage of the test lead wire 13. An end of the body portion is preferably bevelled as shown at 14 in order to facilitate the use of the probe and also to decrease the overall diameter of the probe at the operating end thereof. In the end of the body portion 10 having the bevelled portion 14, a bore 15 is provided.

A conductive (brass) coupler 16 having a bore therethrough is inserted over the wire 13 and is adapted for insertion in the bore 15 in the body portion 10. This brass coupler 16 and the bore 15 are proportioned to provide a press fit of the brass coupler in the bore. An end of the brass coupler 16 has a diametrical slot 17 for coaction with the tip portion 11 in a manner hereafter to be described.

The test lead wire 13 has the insulation removed from the end portion 18 thereof which is adapted for electrical connection with the tip portion 11. The tip portion 11 as readily seen in Figure 1 of the drawings comprises two arms 19, 20 which are formed from a single piece of round Phosphor bronze spring wire or similar material having high qualities of conductivity as well as substantial inherent kinetic energy. The single piece of wire is so bent that the arm portions 19, 20 converge toward one another as their length increases away from the area of the bend and which bent area shown at 21 has a substantial width for coaction with the slot 17 in the brass coupler 16. Thus, the U-shaped tip formed by arm portions 19 and 20 provides a bight portion which is received in the recess or slot 17 of the conductive coupler to prevent its rotation and the test probe is mechanically sturdy by virtue of the securing engagement of the test wire in one end of the hollow insulating handle and the conductive coupler in the other end with said test wire extending therefrom and secured to the U-shaped tip having inwardly biased gripping portions. The converging arms 19, 20 of the tip portion 11 are subsequently bent to provide parallel extending end portions 22, 23 which are in normal contact with one another due to the shape of the tip portion and the inherent kinetic energy of the material.

The interior surface of the free ends of the parallel arms 22, 23 are inwardly bevelled as shown at 24, 25 in Figure 1 so that these two surfaces will act as a guide when the probe is placed on a conductor for testing purposes.

Coacting grooves 26, 27 are provided in contiguous portions of parallel arms 22, 23 for connection with a conductor, terminal or other element in a circuit and, if desired, a plurality of such grooves can be provided in different sizes for use with various sizes of conductors and as shown at 28, 29. These grooves 26, 27 and 28, 29 and the like can be formed in any suitable way in the spring wire constituting the tip at right angles to the longitudinal axis of the tip. Suitable methods for providing the grooves are such as milling and/or swaging. It is obvious that other methods providing adequate results may be utilized.

The bent end portion 21 of the tip is connected with the end portion 18 of the test lead wire 13 from which the insulation has been removed. As will be seen from Figure 1 of the drawings, the spring tip portion is joined to the test lead wire by a simple loop and this area is then fitted into the slot 17 in the brass coupler 16. The bent portion 21 fits into the slot 17 whereas the loop portion of the wire passes through the center hole or bore of the coupler and is consequently soldered therein. An insulating sleeve 12 surrounds the converging arm portions 19, 20 of the tip as also a portion of the parallel arms 22, 23. This insulating sleeve can be of any suitable elastic and electrical insulating material and should cover as great an area of the tip shank as possible to prevent accidental short-circuiting of circuit elements with which the probe may be used. The flexibility of the insulating sleeve or body makes it possible for the tips to spread so as to accommodate within the grip of the grooves a wire to which the probe is to be connected. Owing to the insulating sleeve extending to within a short distance of the ends of the parallel arms 22, 23 a very small exposed tip area is provided which further decreases the possibility of a short-circuit in circuit elements of close proximity. Also the small size tip utilized in the construction makes it possible to reach into places and to be locked on to elements which would be inaccessible with any known conventional constructions.

When the various elements have been assembled as set forth above in that the tip has been connected to the lead wire and the bent area has been inserted in the groove 17 and soldered therein, the insulating sleeve is then placed over the tip and the thus assembled unit is pressed into the bore in the body portion 10 and the sleeve 12 will be in abutment with and preferably sealed to the end of the body portion 10 for better performance and safety.

In use the tip is pressed onto the wire or conductor and due to the inwardly bevelled portions 24, 25 the parallel arms 22, 23 will be separated and the wire or conductor will become seated in the first groove. In the event that the wire or conductor is of larger area than the size of the first grooves a further pressure with a slight rotary action of the probe will cause the wire to be seated in the second notch and locked in by the pressure developed due to the kinetic energy of the spring tip. The probe is also adapted for fastening and providing effective connection to sheet metal elements such as chassis walls, internal braces, solder lugs, etc. It is to be noted that due to the inward pressure of the spring tips effective contact will be maintained even though the wire or conductor does not fit the notch exactly. If desired, V-shaped grooves can be substituted in the tip to facilitate effectiveness or function.

The nature of the material utilized for the spring tip insures a long life without destroying the effectiveness thereof and at the same time eliminates the possibility of accidental disconnection from a circuit or element.

An electrical test probe tip as herein described due to its outstanding "lock on" characteristics also eliminates hand capacity effects on critical measurements which is highly desirable in devices of this nature.

In order to remove the probe from an element or conductor it can be rotated slightly so as to reduce the area in contact with the conductor with a consequent reduction of the gripping action and lift it off the conductor.

It is obvious that changes and modifications can be effected in the single embodiment of the invention described above without departing from the scope of the present invention as defined in the appended claims.

I claim:

1. An electrical test probe comprising a hollow insulating handle, with a test wire received in one end and a conductive coupler secured in the other end with said wire extending therefrom and secured to a U-shaped tip having inwardly biased gripping portions, the bight of the U-shaped tip being received in a recess of said coupler to prevent its rotation.

2. An electrical test probe comprising an elongated electrically insulated body portion having a longitudinal bore therethrough, a test lead wire extending through said bore in said body portion, an end of said body portion having an enlarged opening coaxial with said bore, a conductive coupler fitting through pressing into said enlarged opening and enclosing said test lead wire, a tip secured to said test lead wire comprising a single piece of wire of high elasticity which is bent to form a substantially large flat rear portion and two converging arm portions which terminate in parallel contacting portions, and said coupler having a diametrical slot in an end into which said substantially flat rear portion is attached whereby said parallel arm portions are in normal contact with one another due to the bent shape of the tip and the inherent elastic nature of the bent wire and to prevent rotation of said tip with respect to said conductive coupler and said body portion.

3. In an electrical test probe as claimed in claim 2, and including an insulating jacket of elastic material surrounding said tip portion exposed from said body portion and stopping slightly short of the free ends of said parallel arm portions.

ARTHUR RAYMOND JUBENVILLE.

References Cited in the file of this patent

UNITED STATES PATENTS

| Number | Name | Date |
|---|---|---|
| 837,599 | Williams | Dec. 4, 1906 |
| 1,515,860 | Howard | Nov. 18, 1924 |
| 1,543,524 | Sherman | June 23, 1925 |
| 1,594,055 | Filkins | July 27, 1926 |
| 1,799,747 | Harvey | Apr. 7, 1931 |
| 2,457,506 | Sorensen | Dec. 28, 1948 |
| 2,485,881 | Helin | Oct. 25, 1949 |
| 2,529,270 | Webster | Nov. 7, 1950 |

FOREIGN PATENTS

| Number | Country | Date |
|---|---|---|
| 26,397 | Great Britain | Nov. 18, 1912 |
| 309,284 | Great Britain | Apr. 11, 1929 |